Nov. 7, 1944.   H. H. TALBOYS   2,362,417
METHOD OF SURFACING FLOORS AND THE LIKE
Original Filed Aug. 2, 1940   8 Sheets-Sheet 1

Inventor
Henry H. Talboys
by Parker & Carter
Attorneys.

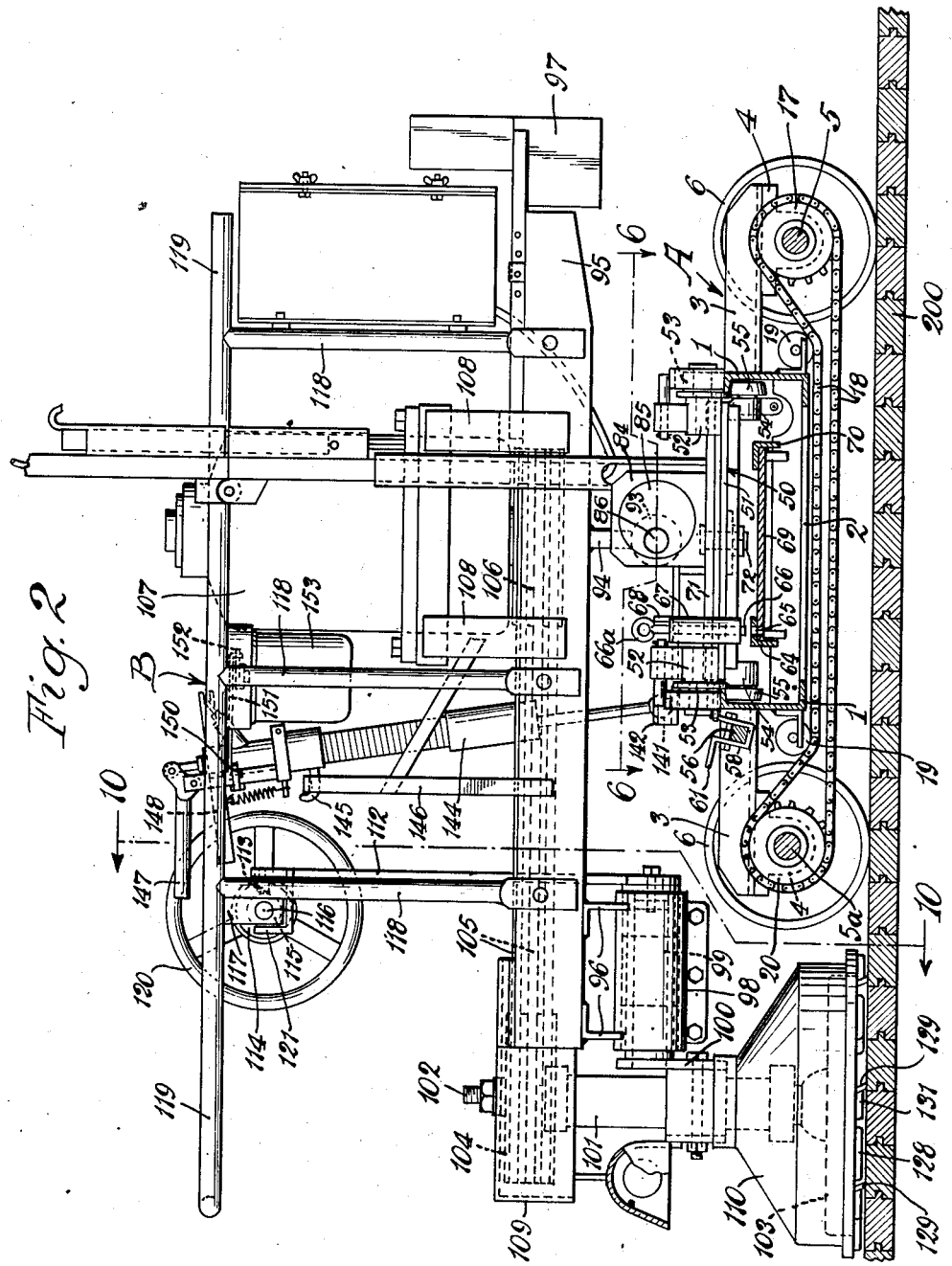

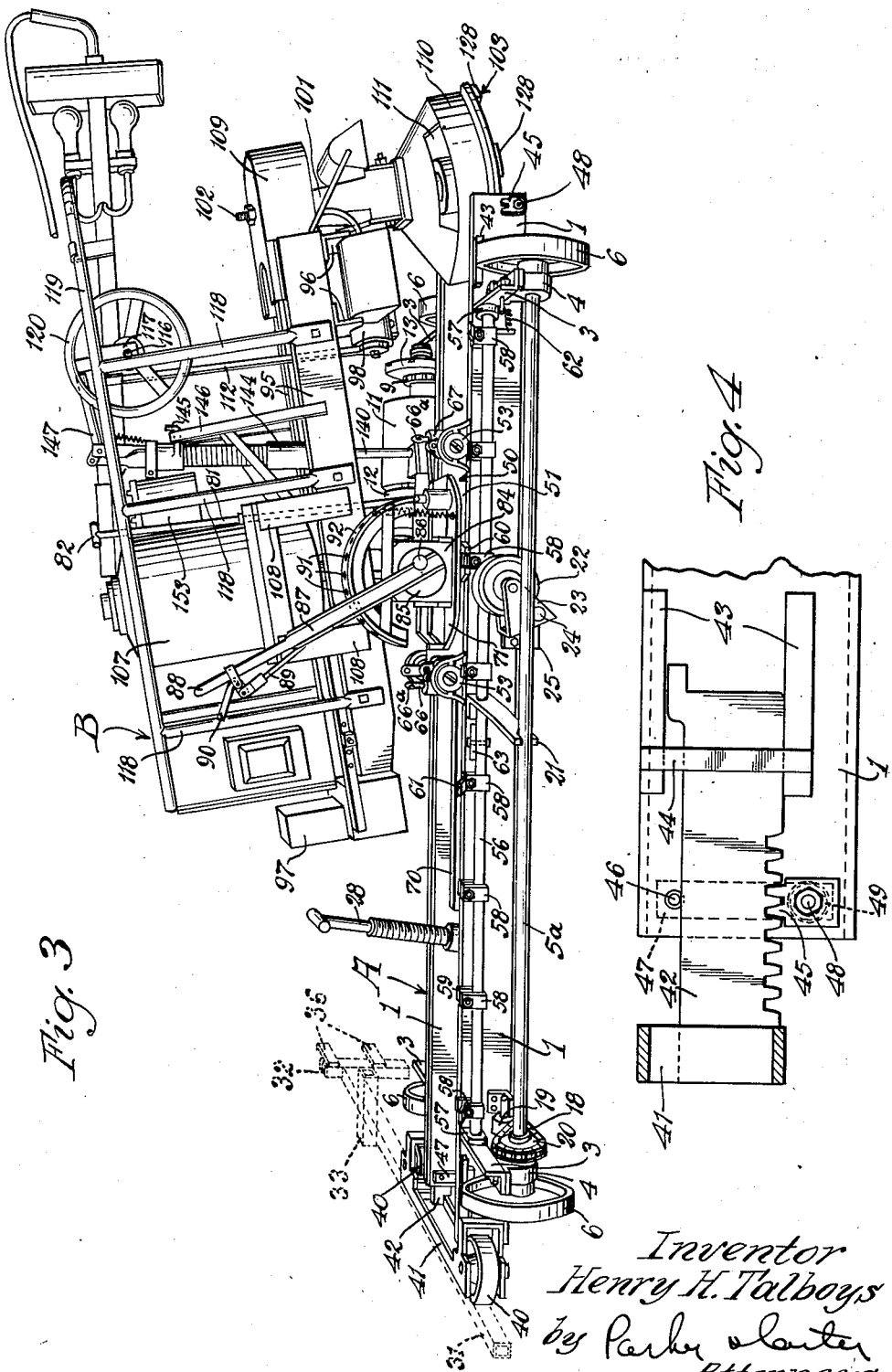

Nov. 7, 1944.     H. H. TALBOYS     2,362,417
METHOD OF SURFACING FLOORS AND THE LIKE
Original Filed Aug. 2, 1940     8 Sheets-Sheet 5
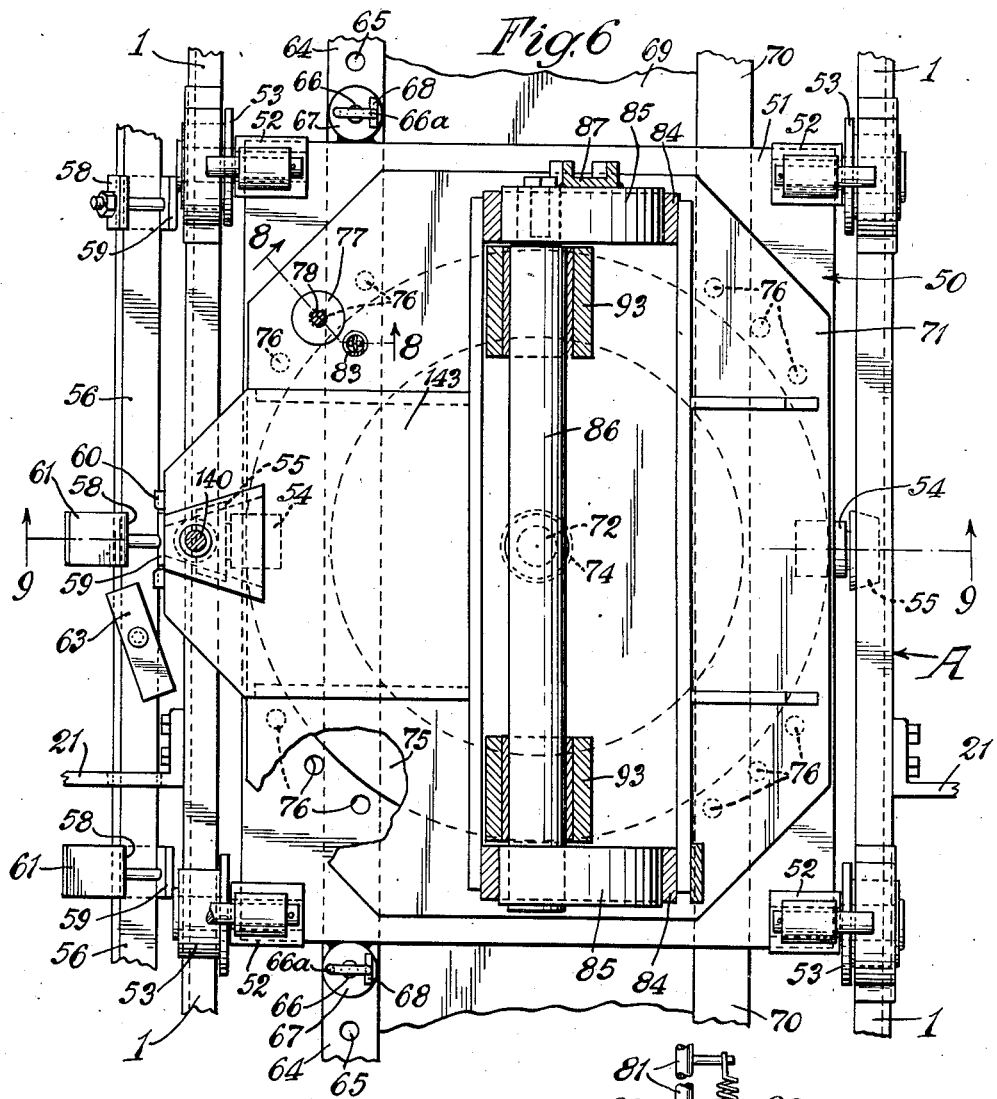
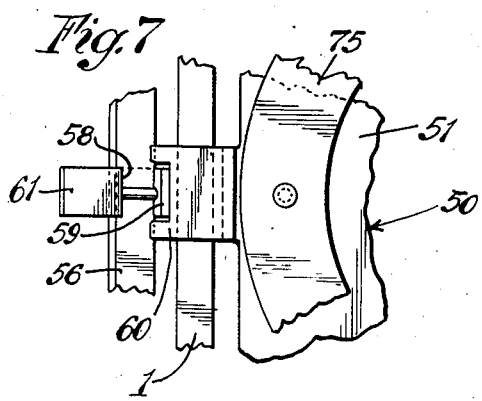
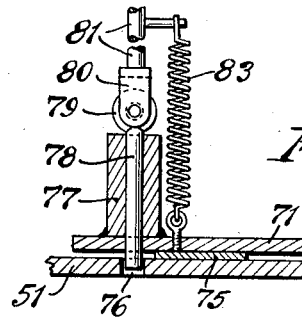
Inventor
Henry H. Talboys
by Parker & Carter
Attorneys

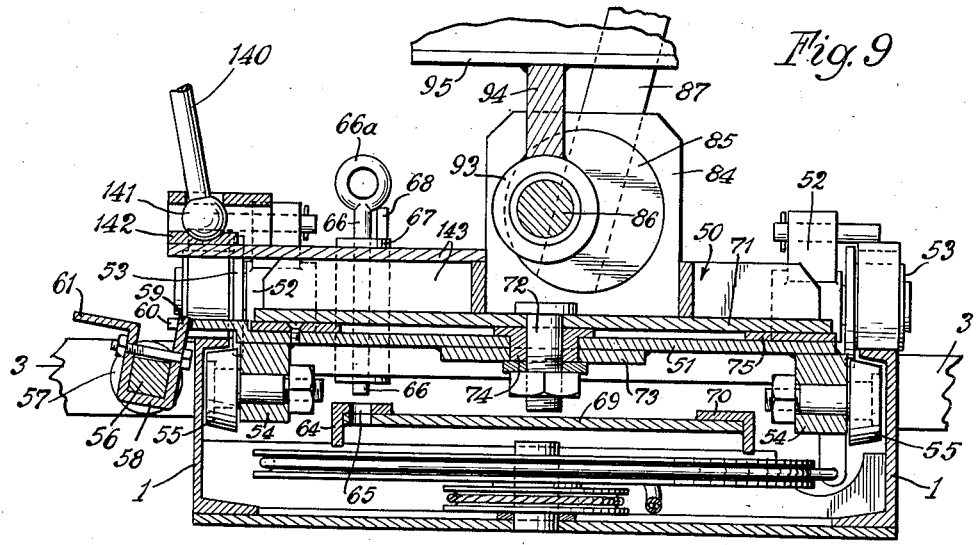

Nov. 7, 1944.  H. H. TALBOYS  2,362,417
METHOD OF SURFACING FLOORS AND THE LIKE
Original Filed Aug. 2, 1940  8 Sheets-Sheet 7
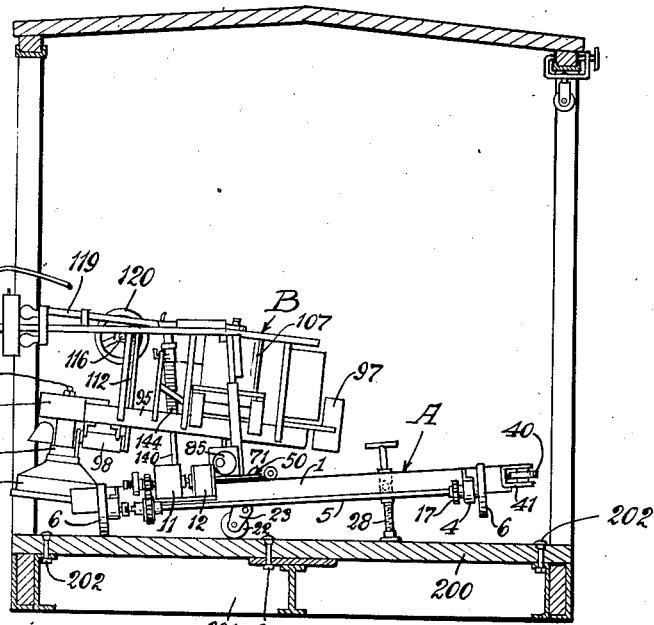
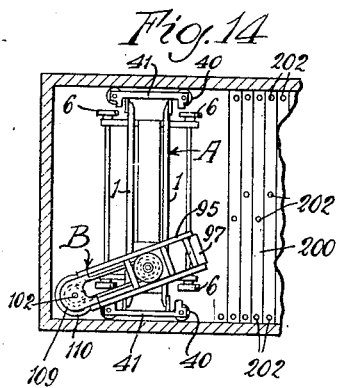
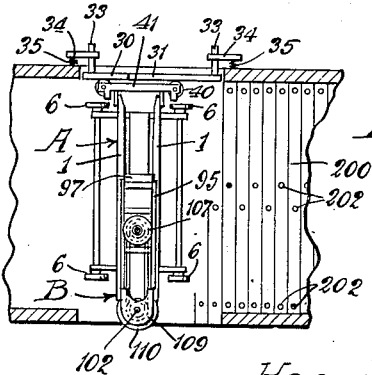
Inventor
Henry H. Talboys
by Parker & Carter
Attorneys.

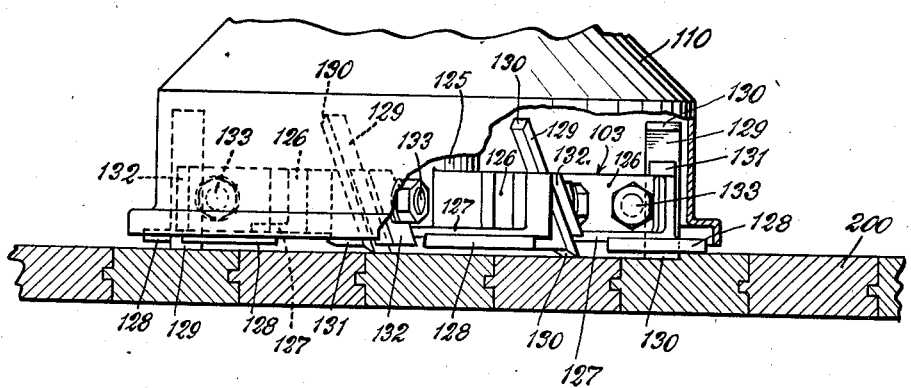
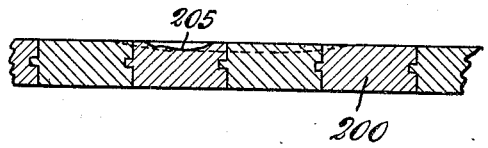
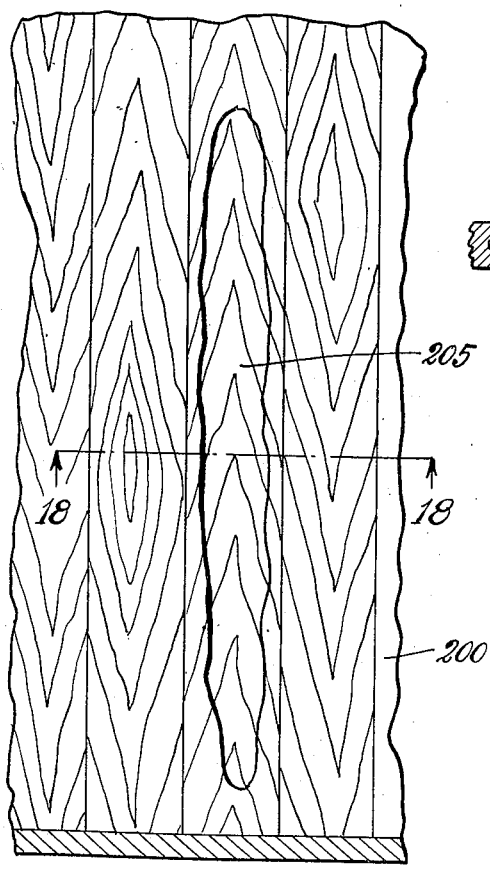

Patented Nov. 7, 1944

2,362,417

UNITED STATES PATENT OFFICE 2,362,417

METHOD OF SURFACING FLOORS AND THE LIKE

Henry H. Talboys, Milwaukee, Wis., assignor to Nordberg Manufacturing Company, Milwaukee, Wis., a corporation of Wisconsin Original application August 2, 1940, Serial No. 349,799. Divided and this application September 15, 1941, Serial No. 410,877

2 Claims. (Cl. 144—309)

My invention relates to an improvement in method of surfacing or re-surfacing floors or surfaces of wood or the like. It is particularly adaptable to re-surfacing freight car floors, but may be applied to any floor or surface of wood or the like, for example boat decks.

One purpose is the provision of a method for re-surfacing floors where the surface of the boards is worn or uneven, or where material has adhered to or penetrated the surface which is likely to be damaging to goods thereafter stored or carried upon the floor.

Another purpose is the provision of a method for re-surfacing freight car floors which is effective to restore unusable floors to usability, and thereby to prevent the necessity of reconstructing or rebuilding freight car floors.

Another purpose is the provision of a method for evening off boards in floors, for example where the boards of which the floor is made have depressions or unevennesses in them or parts which project above the normal surface of the rest of the floor.

Another purpose is the provision of a method for finishing the floor of a restricted space which includes employing the walls of the space as a guide for a cutting means and successively imparting to said cutting means, at different positions in relation to the side walls of the space, a rectilinear movement along said space whereby said space is finally reduced to a desired level.

Another purpose is the provision of a method for re-finishing floors, for example in freight cars, which includes temporarily removing securing means, bolts and the like, without removing the flooring, and re-surfacing the flooring.

Another purpose is the provision of a method for surfacing floors and the like which includes first surfacing or reducing a track or supporting area for the support and movement of cutting means, and thereafter reducing intermediate and adjacent parts of the flooring to a desired level.

Other purposes will appear from time to time in the course of the specification and claims.

The present invention is a division of my copending application Serial No. 349,799, filed in the United States Patent Office on August 2, 1940, and issued as Patent No. 2,320,161, on May 25, 1943.

I illustrate means for practicing my invention, more or less diagrammatically, in the accompanying drawings wherein:

Fig. 2 is a section on the line 2—2 of Fig. 1;

Fig. 3 is a perspective side view of the structure;

Fig. 4 is a section on an enlarged scale on the line 4—4 of Fig. 1;

Fig. 6 is a section on an enlarged scale on the line 6—6 of Fig. 2;

Fig. 7 is a detailed partial plan view illustrating the locking mechanism for the structure shown in Fig. 6;

Fig. 8 is a section on the line 8—8 of Fig. 6;

Fig. 9 is a section on the line 9—9 of Fig. 6;

Fig. 10 is a section on the line 10—10 of Fig. 2;

Fig. 11 is a vertical transverse section through an edge portion of the car floor, illustrating its finished condition;

Fig. 12 is a vertical transverse section through a car illustrating the mechanism as first inserted through the car door;

Fig. 13 is a horizontal section of the car illustrating the mechanism in place and diagrammatically illustrating its movement in relation to the car floor;

Fig. 14 is a partial horizontal section illustrating the mode of finishing car corners;

Fig. 15 is a partial horizontal section through the car illustrating the finishing of the door space;

Fig. 16 is a side elevation, with parts in section, illustrating the operation of the cutter on the floor;

Fig. 17 is a plan view illustrating one type of floor unevenness which has to be coped with; and Fig. 18 is a section on the line 18—18 of Fig. 17.

Like parts are indicated by like symbols throughout the specification and drawings.

Figure 1:
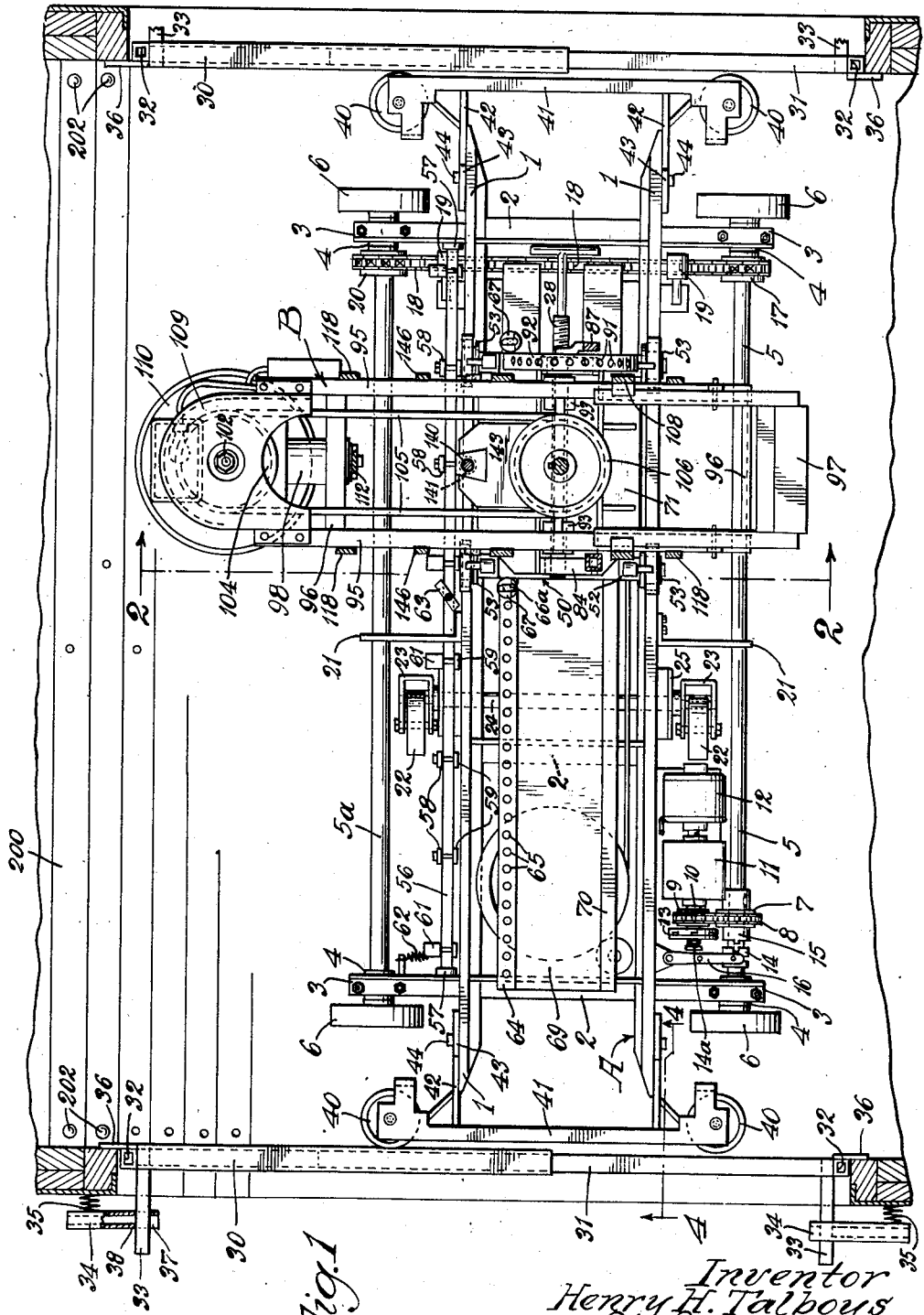
Fig. 1 is a plan view of the device in position within a freight car, with part of the upper frame structure omitted and parts in section.

Referring to the drawings, the mechanism as a whole may be subdivided into the following general subdivisions:

Referring, for example, to Fig. 3, A generally indicates a base frame structure, which includes longitudinally extending side frame members or channels 1, which may be connected by any suitable means, such as transversely extending angle members 2. At each end of the structure so formed are outwardly extending brackets 3, which may also be formed of angle irons, the whole frame member being unitarily secured together, for example, by welding. The brackets 3 may carry any suitable bearing members 4 at each side thereof, in which are mounted axles 5, at each end of which are supporting rollers or wheels 6.

Figure 5:
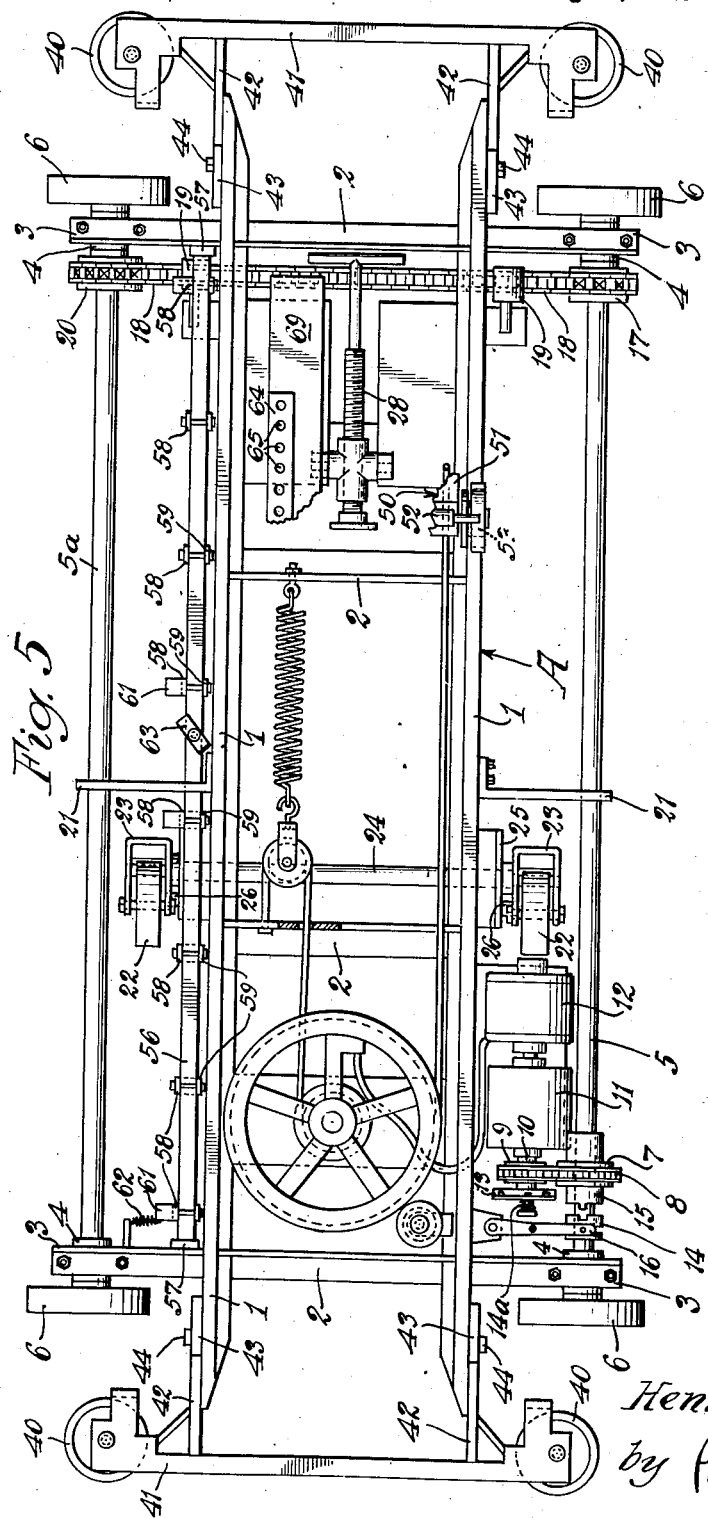
Fig. 5 is a plan view of the lower structure or base frame, with parts of the upper structure broken away.

One of the shafts 5, as shown in Fig. 5, carries a sprocket wheel 7, about which passes a drive chain 8, which in turn passes about another sprocket wheel 9 on a shaft 10, which is driven by a gear reduction 11, which in turn is driven by any suitable motor 12. A friction clutch 13, normally held in position by a spring 14a, serves as a safety release, effective when the frame reaches one or another end of the car. The sprocket wheel 7 is normally rotatable in relation to the shaft 5, but may be held against rotation therewith by any suitable clutch mechanism, including the clutch element 14, adapted to engage with a corresponding clutch element 15, moveable with the sprocket 7. 16 is a clutch actuating lever, which may be actuated in any suitable manner, under control of the operator, so that the operator may clutch or de-clutch the device as he wishes.

At the opposite end of the shaft 5 is a sprocket 17, about which passes a drive chain 18, which in turn passes beneath guide rollers 19 and to a sprocket 20 on the opposite shaft, which is indicated in Fig. 5 as 5a. Thus the motor 12 is effective to drive the shaft 5, and, through the shaft 5, to drive also the shaft 5a, whereby all of the supporting and conveying wheels 6 are driven.

In order to support the shafts 5 and 5a, I may provide intermediate brackets 21, which are shown as notched at the ends and serve as intermediate supporting means for the elongated shaft.

In order to assist in moving the base frame A into and out of the car, for example through a car door, I provide supplemental supporting wheels 22, one on each side, which are pivoted on brackets 23, which brackets in turn are pivoted upon a shaft 24, which passes through downwardly extending flanges 25. When the wheels 22 are in the lower position, the member 23 abuts against a stop 26, and the wheels 22 are then in position to support the base frame A and to permit it to be rolled transversely across the floor of the car. Also, these wheels are effective for transporting the base frame when it is outside of the car, the base frame in such case being rolled in wheelbarrow fashion.

During the actual use of the device, when the base frame is in position in the car, the wheels 22 are not in use, and the wheels 6 serve as the entire support for the base frame A. In order to permit the wheels 22 to be swung into and out of position, I may employ any suitable jack means generally indicated as at 28 for manually raising and lowering one end of the base frame A. The base frame is shown as raised by the jack in Fig. 12. When so raised the wheels 22 may easily be moved into or out of supporting position.

When the base frame A has been moved into the car in the position in which it is shown in Fig. 12, the jack has been lowered to the horizontal position in which it is shown, for example, in Fig. 5, and the wheels 22 have been previously moved into the inoperative position in which they are shown, for example in Fig. 3, the upper frame, generally indicated as B. and which will later be described in detail, is rotated in relation to the main or base frame A. for example, into the position in which it is shown in Fig. 13, or in any other suitable position in which it does not project outwardly into the door aperture. I then provide guide or limit means which are positioned in the door aperture themselves. These limit means, shown in Fig. 1, include a telescopic guard bar, including the interfitting members 30, 31. At the opposite ends of the members 30, 31 are vertical bars 32, which may be welded thereto. Associated therewith are outwardly extending bars 33, at the ends of which are slidable brackets 34, which carry springs 35 adapted to engage the exterior of the car.

The members 32 have also abutting lugs 36 which engage the inside of the edge of the door aperture. They are out of alignment with the guide members 30, 31. The members 34, which are shown as hollow and slidable on the members 33, may be manually moved to the proper position, and then bind because they are outwardly cut away as at 37, to form a locking edge 38, which engages and bites into the bars 33 when the members 34 are tilted by the springs 35.

The thrust of the springs 35 therefore serves to hold the parts in position, and the guide members 30, 31 are held at the proper elevation by the abutment of the bottoms of the members 32 against the car floor. The guide members 30, 31 are at the general height of the base frame A and are adapted to be engaged by guiding end rollers 40 mounted on any suitable bracket structures 41, which in turn are mounted on racks 42, the inner ends of which are guided by any suitable guiding means, such as the members 43, and the side strap 44, as shown in Fig. 4, mounted on the side frame members 1. They may be locked in position by a toothed abutment 45 which is secured to the side frame member 1. The racks 42 are tiltable for the purpose of adjustment in relation to the teeth 45, and when properly adjusted, they are locked against tilting movement by any suitable locking pins 46, on a spring thrust plate 47, mounted on a bolt 48 and normally held in position by any suitable spring 49. The brackets 41 are so adjusted as to cause the wheels 40 to abut against the opposite sides of the car and also against the guide members 30, 31, which lie in the plane of the side of the car. Thus the base frame as a whole may be moved from end to end of the car and is guided against transverse movement in relation to the car by the rollers 40, which abut against the sides of the car and against the guides 30, 31.

The upper or tilting frame B is mounted upon the base frame A by means of a carriage assembly generally indicated as 50. The carriage includes a plate 51 having at each corner a boss 52 supporting a flanged roller 53. These four flanged rollers 53 ride upon the upper flanges of the side frame members 1 of the base frame A. In the center of each side of the plate there is a depending boss 54, which carries a roller 55 engaging the lower face of the top flange of the side frame member 1, as shown for example in Fig. 9. Thus the carriage plate 51 may be slid or rolled from end to end of the base frame, but it cannot be tilted out of its normal horizontal plane.

In order to lock the carriage 50 in relation to the base frame A, I provide a square rotatable bar 56 which is mounted on the angle members 3 of the main frame A, in the bearings 57. It is provided with a plurality of U-shaped locking elements 58 located at spaced intervals upon the bars 56. Each of these elements is provided with an upwardly extending stop 59 adapted to engage a slotted locking lug 60, which extends outwardly from the carriage plate 51. Some of the members 58 are provided with outwardly extending actuating members 61, which may be engaged, for example, by the foot of the operator in order to rotate the shaft 56 and thereby move the stop 59 out of locking engagement with the lug 60, thereby permitting longitudinal movement of the carriage 50 along the base frame A until it has again locked.

Any suitable spring 62 (see Fig. 3) may be provided for tending normally to rotate the shaft 56 into locking position. I may also provide a rotatable latch 63, as shown for example in Figs. 1 and 6, which may be rotated into position to hold the square shaft 56 in unlocked position. The latch 63 is shown in Fig. 1 rotated into inoperative position. When it is desired to lock the carriage 50 in an intermediate position between the main locking positions provided by the stops 59, I provide a longitudinally extending angle 64, provided with apertures 65 adapted to receive locking pins 66 mounted on bosses or blocks 67, which may be welded or otherwise secured to the carriage plate 51.

The locking pin may be headed, as at 66a, and is normally held in inoperative position when the head or ring is rotated in such position as to engage a stop 68. The pin 66 is normally held in inoperative position as shown in Fig. 9. If it is rotated to turn the ring 66a flatwise to the stop 68, the pin may then be dropped into one of the apertures 65. 69 is a closure or cover plate associated with the angle 64, and 70 is a similar but unapertured angle at the opposite edge of the plate 69. The angles and plate rest on or are secured to the transversely extending frame members 2 of the base frame A. The carriage 50 may be pushed by hand to the desired position and then locked by one of the above described means.

Rotatably mounted above the plate 51 is an upper plate or turntable 71, to which may be welded the king pin 72, which passes downwardly through the plate 51 and through a reinforcing member 73. Any suitable bearing means for the king pin are indicated as at 74, and a bearing ring 75 is interposed between the plates 51 and 71. In order to lock the upper plate 71 at any desired position in relation to the lower plate 51, I provide apertures 76 in the lower plate 51, shown for example in Fig. 6. I may provide, for example, three at each corner. Thus the turntable would be locked at each ninety-degree angle of arc of movement. The extra apertures serve to provide the necessary angle for taking care of the corners in the car.

Mounted on the upper plate 71 is a sleeve 77 which carries a plunger 78 adapted to penetrate the apertures 76. The punger has an eye 79 at the upper end thereof which forms part of a hinged connection through a fork 80 connected to the actuating rod 81, which extends upwardly to any suitable handle 82, shown for example in the upper part of Fig. 3. A spring 83 normally holds the plunger in the downward position and in locking engagement with one of the apertures 76.

Welded or otherwise secured at opposite edges of the plate 71 are upwardly extending blocks 84 which are apertured, rotatably to receive discs 85, to both of which is eccentrically fixed a shaft 86. On the outside of one of the discs 85 is mounted an actuating handle or lever 87, as shown for example in Fig. 3, which may have a handhold portion 88 at the top. Any locking member 89 may be employed, controlled by a handle 90, and including a lower end adapted to penetrate locking apertures 91 in a locking segment 92, mounted on the appropriate block 84. Mounted on the shaft 86 are bearings 93 which serve to carry the actuating superstructure below described.

Upwardly extending from the bearings is the transversely extending bar 94. Secured to this bar 94 are side frame members or channels 95 connected by transverse frame members 96 and constituting, in effect, a tiltable boom. The boom carries at one end an adjustable counterweight structure 97. At the opposite end and secured to two of the transversely extending frame members 96 is a bearing sleeve 98, which carries any suitable shaft 99. At one end of the shaft is a plate 100, upon which is mounted any suitable bearing block or sleeve 101, in which is rotatably mounted a cutter shaft 102, the outwardly extending end of which is shown in Fig. 2. At the lower end the shaft carries any suitable cutter head 103. At the upper end of the shaft 102 is any suitable driving pulley 104, about which pass one or more belts 105, which in turn pass about a drive pulley 106, driven by the motor 107, which is mounted in any suitable manner at an intermediate portion of the boom, as, for example, on brackets 108. Any suitable means may be employed, including, for example, a guard housing 109 for the pulley 104, and a guard housing 110 for the cutter head 103. It may be apertured as at 111 to permit the cut particles or shavings to escape.

The shaft 99 may be controllably rotated in order to tilt or adjust the axis of rotation of the cutter head 103. This adjustment may be effected by a securing bar 112 secured to one end of the shaft 99, and provided with an upper end and with a pair of rollers or pins 113, which engage opposite sides of the circular plate 114 on a sleeve 115, which is in screw-threaded relationship with a fixed screw-threaded bar 116, secured to plates 117 on a superstructure which includes the upwardly extending supports 118 and the U-shaped top bar or handle member 119. The sleeve 115 may be rotated by any suitable hand wheel 120, which is held against rotation in relation thereto. The rotation of the wheel 120 is effective to move the sleeve 115 laterally along the screw-threaded rod 116, which effects a tilting of the bar 112 and thus a rotation of the shaft 99 and a control of the axis of rotation of the cutter head 103. The bar 112 is held in position in relation to the sleeve 115 by any suitable keeper member or hook 121. In order to control the adjustment I provide any suitable gauging means, including a pointer 122 opposed to graduations 123 on the sleeve 115. Thus the degree of inclination may be observed by the operator as he rotates the hand wheel 120 and obtains his desired adjustment.

The cutter head, which is shown in some detail in Fig. 16, and which is secured to the lower end of the cutter shaft 102, includes a central hub structure 125 having outwardly extending ribs 126, with connecting or reinforcing webs 127, which are formed integrally with floor-engaging portions or shoes 128. Cutter bits or knives 129 having cutting edges 130 at top and bottom thereof for purposes of reversal are removably secured to the ribs 126 by means of removable supporting blocks 131, clamping members 132, and securing bolts 133, which pass through the ribs 126. The bottom of the member 131 is shown as in the same plane as the bottom of the ground-engaging shoes 128, but the lower or operative edge of the bit 129 extends somewhat therebelow. The knives are shown as narrow and may be located, if desired, at various distances from the center of the cutter 103 to prevent ridging if the cutter is moved across the car too fast. It will be understood, however, that these knives may be arranged in a variety of ways and may, if desired, be concentrated at the periphery of the cutter, although some or all of them may be staggered at various distances from the center.

In order to hold the boom adjusted at any desired angle I provide a hydraulic jack which includes a lower plunger 140 having a ball 141 at the lower end which is seated in any suitable socket or containing member 142, supported on the upper plate 71 by any suitable intermediate supporting structure generally indicated as 143. The jack body proper is indicated at 144. It is provided with a laterally extending upwardly turned hook 145, which extends beneath the V-shaped strap or bracket 146, the lower ends of which are secured to the side frame members 95 of the boom. Thus when the jack is expanded the hook 145 tilts the boom bodily about the axis of the shaft 86. The boom rests gravitally upon the hook 145. Any suitable actuating means for the hydraulic jack may be employed.

I illustrate, however, any suitable controlling handles 147 and 148. I find it advantageous, however, to employ the jack controls as means also for controlling the motor 12, which moves the base frame along the car. I illustrate, therefore, a connecting lever 150 which may be actuated by a bodily rotation of the jack body itself about its axis. It has adjustably secured to it a connecting link 151, which engages the switch arm 152 on a switch housing 153, which may be mounted in any suitable manner on the superstructure, including the members 118 and 119. It will be understood that the switch is effective to stop, start and reverse the motor 12, whereby the base frame may be moved along the floor of the car and stopped at any desired position.

It will be observed that the control handles of the jack are located in convenient relation to the adjusting wheel 120 for the convenience of the operator. Any suitable switch means, not herein shown, may be employed for controlling the motor 107.

It will be realized that, whereas I have described and shown a practical method and the means for carrying it out, the method may be carried out with a variety of mechanisms and with a substantial variation in details and order of steps. I, therefore, wish my description and drawings to be taken as in a broad sense illustrative.

The use and operation of my invention are as follows:

I have described a method for finishing or refinishing floors. Without wishing to be restricted to any specific use of my method, it will be observed that my invention may be advantageously used in re-finishing freight car floors. Freight car floors are prevailingly made of rather heavy planking, the individual planks or boards extending transversely across the freight car and being secured with bolts along the ends and along the central portions, as illustrated at 202 in Fig. 13. Freight car floors are subjected to heavy use, and the surface may become damaged or uneven, or may be covered with or impregnated with material which is damaging to the goods shipped thereafter. For example, flour or more or less adhesive substances, oil and the like, may cover or penetrate the plank surface. After a certain degree or time of use, the floor becomes unusable, and it is then, under present practice, necessary to remove the planking and replace it with fresh planking at a considerable cost in time and expense. My invention makes it possible to prolong the life of a car floor by re-finishing the surface and cutting it down to a somewhat lower level, thereby postponing the necessity of rebuilding the floor. Since the work has to be done in a restricted and badly lighted space, and with a minimum loss of time and at minimum expense, I have developed a method for quickly and efficiently resurfacing the freight car floor, without the necessity of removing and replacing the boards.

It will be realized, of course, that my invention may be applied to other uses and the same mechanism or a variation thereof may be employed to re-finish any planked surfaces, such as board walks, docks, decks, shipping sheds, storage sheds, or bins, and the like, and I do not wish that my claims be limited specifically to car floor re-finishing, except so far as specifically so limited by their language. It will be understood also that, where I have talked primarily in terms of re-finishing a floor, my method may be applied to a finishing of new floors where rough or uneven planking is employed, or where depressions, such as those shown in Figs. 17 and 18, exist.

Referring to the drawings, and considering my invention as applied to a car, the car floor is indicated at 200. It may be formed of a plurality of individual boards or the like. Normally these boards are secured to the under structure 201 of the car by bolts 202 at the ends of the boards, and also generally along the centers of the boards. This securing arrangement will be clear from Fig. 12. When the floor is to be finished or re-finished, the center bolts 202 are removed, while the outer bolts along the wall of the car may be left in place. The end bolts along the door aperture may also be removed, as is indicated in Fig. 1.

In the operation of the device the bolts are first removed as above described, and the entire assembly is then inserted through one of the doors, the rollers 22 being employed for rolling it in. Thereafter the jack 28 is employed to tilt the base frame A, and the supporting wheels 22 are then moved into the inoperative position. The jack 28 is then moved to inoperative position, and the base frame is supported at each end upon the supporting wheels 6. The guards or guides for the doors, including the bars 30, 31, are then positioned in place in the plane of the inner face of the car walls and at the level of the guiding wheel or wheels 40 of the base frame A. The members 41 are adjusted to provide the proper clearance, and the base frame is then ready to be moved longitudinally along the length of the car to any desired position.

It will be well to consider the operation of the cutter as such. It will be understood that the cutter is generally vertically axised, as shown for example in Fig. 10, and includes a vertical shaft 102, which may be rotated for example through the pulley 104 and the belts 105. It is characteristic of the cutter and of its operation that it is permitted to rest upon the floor, and in effect floats on the old floor surface. As will be seen, for example in Fig. 16, the toes or outward projections 128 ride on the old surface and not merely support the cutter as a whole but gauge the cut. The individual knives 129 may be set, for example, to take about a 1/8" cut, and in the operation of the device the cutter is simultaneously rotated and moved transversely or horizontally so that the toes or projections 128 are continually resting on the old surface of the floor, and the knives 129, which are preferably staggered, cut the new surface. By tilting the axis of the cutter somewhat from the vertical, the operator can cut a beveled surface, for example along the side of the car, in order to miss the bolts 202. This bevel or taper is illustrated, for example, in Fig. 11. This tilting also permits cutting or trimming unevennesses in the floor to care, for example, for such depressions as are shown at 205 in Figs. 17 and 18. Where such a depression exists the operator may somewhat tilt the axis of the cutter and trim off the sharp edges of the depression to make a more gradual declivity, as shown for example in dotted line in Fig. 18.

Assume that the base is moved first to one end of the car, as shown in Fig. 13. A convenient way of employing the device then is to cut a path from end to end of the car at each side thereof to provide a level support for the wheels 6. After the cutting head has been appropriately adjusted with the axis of the shaft 102 vertical, the cutting is done by bodily moving the base frame A from end to end of the car by means of the motor 12 while the cutter is rotating. The result is to cut a plane path almost from end to end of the car. It will go to one end completely, as shown by the arrows in Fig. 13, leaving the opposite end for later finishing when the boom is moved to the reverse or dotted line position.

After the side paths have been cut, the operator then adjusts the boom at various steps or positions along the base frame and moves the base frame from end to end of the car, finishing the car floor in successive longitudinal strips or cuts. Thereafter the operator may reverse the boom to put the cutter head in the dotted line position of Fig. 13, and he then similarly finishes the opposite or unfinished end of the car. This finishes all of the car floor except the edges.

The edges may be beveled either during or after the above described operation, by tilting the axis of the cutter shaft 102 through rotation of the wheel 120 and the consequent tilting of the lever 112. This tilting of the axis of the cutter head enables the operator to cut a beveled finish at the car edges and to miss the end bolts 202, as indicated in Fig. 11.

An advantageous procedure is to bevel the surface of the car floor downwardly and inwardly between the bolts which secure the ends of the boards as at 202 and the initially cut guiding strips or side paths. Thus any abrupt change of level is prevented and a reasonably smooth floor surface is provided without the necessity of removing the end bolts 202 and without any damage to the tool.

It will be understood, of course, that the order of these various steps may be varied to suit the convenience of the operator. It will also be understood that the extreme end portions of the boards adjacent the wall are left unfinished in order to miss the securing bolts.

In order to get the cutter head into the corners, the boom may be adjusted at various angular positions by means of the plunger 78 and the aperture 76. One such position for cutting as close as possible an axis to the corner is shown at the left end of Fig. 14.

In order to finish the door spaces it is necessary to take one of the roller supports 41 off, as shown in Fig. 15, the door spaces being finished one at a time, and the boom being moved to the appropriate position.

Where the original boards are worn or broken sufficiently to require replacement, new boards may be put in either before or after the general finishing process. If they are put in before the finishing, they are smoothed down even with the rest in the course of the general finishing. If they are put in afterwards, the cutter head is set to the level of the rest of the floor and the boards are cut down.

It will be understood that the rotation of the eccentric 85 is effective bodily to raise and lower the boom as a whole. Since the cutter head as a whole rests on the floor by means of the shoes 128, this raising or lowering of the boom is effective slightly to tilt the axis of the cutter head.

It will be understood, of course, that the cutter heads as a whole are readily replaceable, that the individual knives are readily replaceable, are reversible, and are easily sharpened. In practice I find that a crew of two, or at the most three, men can finish off a car floor in an hour. One man operates the machine, one man sharpens the knives, and if necessary a third man may sweep, keeping shavings away from the wheel tracks. My cutter can hit nails or bolts without hurting the cutter as a whole. It rests on the old floor and limits the depth to which the blades can cut. The depth can be adjusted by merely adjusting the penetration of the lower edge of the blades or knives below the bottom surfaces of the outward projections or toes 128.

My cutter head has the exceedingly important feature that it takes but a few minutes to change the knives in a head. A new set of knives can be sharpened and placed in the head, for example, each time the cutter is moved to a new car. In practice I may employ, for example, six knives, each 7/8" wide, to be sharpened each time so that it is necessary to sharpen only about 5 1/4" of steel. This constitutes an enormous advantage over the use of a planer type of cylinder, for example, and a cut of the same width would require two 16" steel blades, which would have to be sharpened with great accuracy.

It will be understood, of course, that the car floors are uneven and sag both longitudinally and across the car, and even when the central bolts are removed, the bolts along the edge of the car have to be left, and occasional bolts may be missed. If my cutter strikes a bolt, the knives will not be seriously dulled or broken and will remain as effective as ever. It is important to note that under such circumstances no knife breakage occurs and the work of the cutter will continue satisfactorily and effectively even though an occasional bolt or other metal objects may have protruded into the path of the cutter.

I claim:

1. The method of finishing a worn freight car floor formed of transversely extending boards with securing means at the ends of the boards and intermediate the ends of the boards, which includes initially removing the securing means located intermediate the ends of the boards while leaving the securing means at the ends of the boards in position, thereafter cutting initial guiding strips adjacent the opposite long sides of the cars, said guiding strips being generally parallel with said car sides and located near but inwardly of said end securing means, said strips lying, when finished, at generally the same level, employing said guiding strips as supports for the cutter for use in further recutting the rest of the floor, cutting a series of parallel strips between the guiding strips until the area has been cut down to the desired level, and bevelling the surface of the car floor downwardly and inwardly between said end securing means and the outer edges of the initially cut guiding strips.

2. The method of refinishing a worn out freight car floor formed of transversely extending boards with securing means at the ends of the boards, and having depressions in the floor surface located in the area between said end securing means, which includes initially cutting guiding strips along the opposite long sides of the car adjacent and parallel with the car sides and within said area, and lying in substantially the same horizontal plane, employing said guiding strips as supports for the cutter for use in connection with further recutting the rest of the floor, cutting the surface of said rest of the floor to a predetermined and substantially horizontal plane, to provide a generally flat surface lower than the original surface of the car floor, beveling the surface of the car floor downwardly and inwardly between said end securing means and the outer edges of the initially cut guiding strips, and, in the event that the car floor has depressions which extend below the new surface, and bevelling the edges of said depressions and thereby eliminating sharp edges.

HENRY H. TALBOYS.